(12) United States Patent
Bergeron et al.

(10) Patent No.: US 7,972,412 B2
(45) Date of Patent: Jul. 5, 2011

(54) PROCESS FOR RECOVERING PLATINUM GROUP METALS FROM ORES AND CONCENTRATES

(75) Inventors: Mario Bergeron, Cap Rouge (CA); Marc Richer-Lafléche, Sainte-Foy (CA)

(73) Assignee: Ressources Minieres Pro-Or Inc., Montreal, Quebec (CA)

( * ) Notice: Subject to any disclaimer, the term of this patent is extended or adjusted under 35 U.S.C. 154(b) by 0 days.

(21) Appl. No.: 12/762,503

(22) Filed: Apr. 19, 2010

(65) Prior Publication Data

US 2010/0257978 A1 Oct. 14, 2010

Related U.S. Application Data

(63) Continuation of application No. 10/564,735, filed as application No. PCT/CA2004/001067 on Jul. 20, 2004, now abandoned.

(60) Provisional application No. 60/489,904, filed on Jul. 25, 2003.

(30) Foreign Application Priority Data

Jul. 22, 2003 (CA) .................................. 2435779

(51) Int. Cl.
C22B 1/08 (2006.01)
C22B 11/06 (2006.01)
(52) U.S. Cl. ........................................... 75/426; 75/631
(58) Field of Classification Search .................... 75/421, 75/426, 430, 631, 633; 423/53, 59, 60, 149
See application file for complete search history.

(56) References Cited

U.S. PATENT DOCUMENTS

| 5,074,910 A | 12/1991 | Dubrovsky |
| 5,102,632 A | 4/1992 | Allen |
| 5,238,662 A | 8/1993 | Dubrovsky |

FOREIGN PATENT DOCUMENTS

| CA | 2193783 | * 6/1998 |
| CA | 2303046 | 3/1999 |
| CA | 2314581 | 1/2001 |
| JP | 1234531 | 9/1989 |

(Continued)

OTHER PUBLICATIONS

N Kanari et al, A study of chromite carbochorination kinetics, Metallurgical and Materials Transactions B, vol. 30B, (Aug. 1999), p. 577-587.*

(Continued)

Primary Examiner — George Wyszomierski
Assistant Examiner — Mark L Shevin
(74) Attorney, Agent, or Firm — Nicholas A. Kees; Godfrey & Kahn, S.C.

(57) ABSTRACT

A method for recovering at least one platinum group metal (PGM) species from a feed product selected from the group consisting of chromite ore, chromite ore concentrate and PGM concentrate comprising the steps of: mixing the feed with at least one salt so as to produce a mixture, whereby the concentration of salt in the mixture is sufficient to convert at least one PGM species into a corresponding PGM chloride salt; and contacting the mixture with gaseous chlorine and CO at a temperature between about 240° C. and 800° C. to induce the conversion of at least one species of PGM into a solid material containing a corresponding PGM chloride salt, whereby said chloride salt of at least one PGM species can be recovered.

34 Claims, 2 Drawing Sheets

FOREIGN PATENT DOCUMENTS

| | | | |
|---|---|---|---|
| WO | WO 97/46724 | * | 12/1997 |
| WO | WO 02/053788 | * | 7/2002 |
| WO | WO 2004/070066 A1 | | 8/2004 |
| ZA | 96-2382 | | 3/1996 |

OTHER PUBLICATIONS

Cooper et al., J. Chem. Metal Min Soc. S.A. (1929) 220-230.
Kanari, Ph.D thèse L'institut national polytechnique de Lorraine (1995).
Kim et al, Ind. Eng Chem. Res. 39, (2000) 1185-1192.
Pascal, Masson et Cie, Nouveau traité de chimie minérale, vol. 19, (1958). 949.
Rhee et al., Metallurgical Transactions B, vol. 21B (1990): 321-330.
Rivarola et al., Lat am J.chem eng. appl. chem (1981) 11:47-52.
Vermaak, Mintek (1995) First edition: 85-91.
Zhao et al., Metallurgical Transactions B. vol. 21B (1990). 131-133.

* cited by examiner

PROCESS FOR RECOVERING PLATINUM GROUP METALS FROM ORES AND CONCENTRATES

CROSS REFERENCE TO RELATED APPLICATIONS

This application is a continuation application of U.S. patent application Ser. No. 10/564,735, now abandoned filed Jul. 31, 2006, which is a National Entry Application of PCT application no PCT/CA2004/001067, filed on Jul. 20, 2004 and published in English under PCT Article 21(2), which itself claims benefit of U.S. provisional application Ser. No. 60/489,904, filed on Jul. 25, 2003 and of Canadian application Ser. No. 2,435,779 filed on Jul. 22, 2003. All documents above are incorporated herein in their entirety by reference.

FIELD OF THE INVENTION

The present invention relates to a process for recovering platinum group metals from ores and concentrates. More particularly, the present invention relates to the conversion of platinum group metals in highly soluble chloride complexes that can be recovered from solutions.

BACKGROUND OF THE INVENTION

Chromites and platinum group metals occur in potential association in specific geological environments such as stratified and layered mafic to ultramafic magmatic complexes that have intruded continental rocks. The term "platinum group metals", usually referring to the metals platinum, palladium, iridium, ruthenium, rhodium, osmium, is referred to herein as "PGM". PGM rich chromitites are extremely interesting ores because of their double economic values as: 1) a source of chrome for ferrochromium production, a master ferro-alloy for the stainless steel industry; and 2) a source of metals for the PGM industry.

Presently, there are only a few large mining producers that operate metallurgical facilities capable of extracting PGM from chromitites, and these producers are all based in the Republic of South Africa (RSA). The PGM extraction process of RSA, according to the review of known processes presented by Vermaak 1995, is based on: 1) the production of flotation concentrates which are then submitted to 2) smelting, 3) converting, 4) base metal extraction and 5) PGM purification. This PGM extraction process requires the production of a flotation concentrate and the development of a large metallurgical infrastructure. When considering the large variety of mineralogical composition of the phases carrying the PGM in chromites deposits, their grain-sizes distribution and the PGM concentration, the prospect of efficiently producing a flotation concentrate from chromite ores is often very limited. In addition, building a metallurgical infrastructure based on smelter and on associated technologies is costly and not economically adapted to the extraction of PGM from small and medium scales deposits. There is a need for an improved method of recovering PGMs.

Bergeron, Laflèche, PCT co-pending application no PCT/CA2004/000165 filed on Feb. 6, 2004 discloses a method for carbochlorinating chromites. In that process, a chromite product mixed with NaCl is contacted with chlorine and carbon monoxide in a reactor maintained at temperatures of 157° C. to 750° C. to convert the iron oxide in the ore into gaseous iron chloride which is removed and condensed. The chemical reaction at the heart of the process is: $FeO.Cr_2O_3 + 1.5Cl_2(g) + CO(g) \Rightarrow Cr_2O_3 + FeCl_3(g) + CO_2(g)$. The solid material resulting from the process shows: 1) a large increase in its chromium to iron ratio; and 2) a residual enrichment in bulk $Cr_2O_3$ content. Both effects boost the ore's trading value.

Three broad techniques in the field of chlorine metallurgy can be identified. Broadly, 1) the carbochlorination technique involves using gaseous chlorine in the presence of a reductant such as carbon monoxide, usually chosen for process development, or coke. 2) The chlorination technique involves the use of chlorine without the addition of a reductant agent. 3) The third technique, chlorination in the presence of a salt melt, involves the addition of a large quantity of salt so as to form a molten bath of salt, with or without the generation of gaseous chorine. The carbochlorination, chlorination and chlorination in the presence of a salt melt techniques differ in the chemical reactions that are involved in each of them.

Carbochlorination

The effect of carbochlorination on PGM values contained in spent automotive catalyst is described in the prior art. Rivarola et al., 1981, Lat. am. j. chem. eng. appl. chem., 11, 47-52, describe the volatilization of platinum from $Al_2O_3$ spent catalyst by a chlorine-carbon monoxide mixture. The recovery of platinum, as a volatilized phase, yielded extraction closed to 100%. The influence of temperature, time, and gas flow rates were investigated. Kim et al., 2000, Ind. Eng. Chem. Res., 39, 1185-1192, also describe the carbochlorination of spent automotive catalyst to extract the platinum and rhodium values. After optimization of time, temperature, gas flow rates, partial pressures of chlorine and carbon monoxide, recovery of 95% of platinum and 92% of rhodium were obtained.

U.S. Pat. No. 5,102,632 issued to Allen et al., 1992, relates to a method of recovering platinum, palladium and rhodium dispersed on ceramic support structures. The process involves two steps. In a first step a reducing chlorination is carried out during which the palladium and platinum are volatilized as chlorides. In a second step only chlorine is used to volatilize rhodium trichloride.

Although certain effects of carbochlorination on PGM for other types of ores, concentrates, metallurgical products and materials were known, the effect of carbochlorination on PGM values contained in chromites was never disclosed. The present invention teaches the effect of a formation of $FeCl_3$ on the vapor transportation of PGM and teaches a new process for the recovery of PGM from chromite products and other concentrates.

Chlorination

Extraction of PGM by chlorination from sulphides flotation concentrates was investigated by Cooper and Watson, as early as 1929, J. Chem. Metal. Min. Soc. S. A., 220-230. According to their method, a sulphides flotation concentrate is roasted, mixed with 15-20% of NaCl and chlorinated at 550° C. for six hours. After the chlorination step, the solid is leached with concentrated HCl, PGM are cemented with zinc dust and the solution is filtered to isolate a PGM concentrate.

South African Patent 96-2382 issued to Lalancette and Bergeron, 1996, describes the chlorination of chromites ore for the extraction of PGM. The method described involves mixing the ore with NaCl 10% wt/wt, dry chlorination of the mixture between 350° C. to 800° C. with gaseous chlorine, dissolution of PGM in concentrated hydrochloric acid solution, filtering and recovering the PGM from the solution. PGM recoveries are reported to be in the order of 95 to 100%.

Canadian Patent application no. 2,303,046 in the name of Prior, 1999, teaches the extraction of PGM from a material derived from the smelting of sulphides concentrates rich in base metals. The material is subjected to three gaseous treatments, an oxidizing treatment, a reducing treatment and a chlorination treatment at elevated temperature. After the gaseous treatments, the material is leached with HCl or aqua regia and the precious metals recovered by a chromatographic procedure.

Canadian Patent application no. 2,314,581 in the name of Craig and Grant, 2000, describes a method for the removal of base metals, especially the amphoteric elements present in metallurgical concentrates containing 60 wt % and more of precious metals. The presence of the base metals in the precious metals concentrates is considered to be detrimental to the down stream refining steps. The method described comprises the following steps: a) a high temperature treatment of the concentrate with gaseous HCl; b) a treatment of the residue, if desirable, with chlorine gas, c) a high temperature treatment of the residue with oxygen, d) a high temperature treatment of the residue with hydrogen. This procedure minimizes losses of precious metals during the removal of the amphoteric elements.

Salt Melt Chlorination

U.S. Pat. No. 5,074,910 issued to Dubrovsky, 1990, teaches the recovery of precious metals from base metals sulphide ores by chlorination in a molten salt bath in the presence of chlorine gas. The feed is pressed into pellets with addition 50% wt/wt of salt, fed to a reactor and contacted with chorine gas at a temperature producing a molten salt bath. After the complete conversion of the precious metals into chlorides, the precious metals are then recovered from the melt by a suitable means.

U.S. Pat. No. 5,238,662 issued to Dubrovsky, 1993 describes the recovery of precious metals contained in a matte obtained from the smelting of sulphide concentrates rich in base metals. The matte is contacted with gaseous chlorine in a molten salt bath to effectively convert the PGM into their chlorides forms. A further selective dissolution technique for PGM involving multiple dissolution stages is also presented.

As indicated earlier, processes based on chlorination and salt melt chlorination for PGM recovery from ore, minerals and metallurgical concentrates involve chemical reactions that differ from those involved in carbochlorination. Furthermore, although carbochlorination was performed on PGM contained in spent catalyst, prior to the present invention thus, no data existed on the behaviour of PGMs during the carbochlorination of PGM rich chromites products and other concentrates.

Hence, there is a need to develop a process that can extract PGM from ores and concentrates including chromites. This process would desirably be adaptable to a situation where a chromite is subjected to an enrichment process as described in co-pending no PCT/CA2004/000165 by Bergeron and Laflèche by which the iron is extracted as gaseous $FeCl_3$. This treatment could desirably be designed so that it could be performed simultaneously to the enrichment of chromites.

SUMMARY OF THE INVENTION

It was surprisingly discovered that the action of chlorine combined with carbon monoxide resulted in the dissolution of PGM species in slightly acidic solution. It was further discovered that carbochlorination of chromites would not result in excessive volatilization of PGM species in $FeCl_3$.

A bibliographic study realized by Kanari, Ph. D. thesis Polytechnic Institut of Lorraine, 1995, on the formation of gaseous chlorides demonstrated that some chloride compounds are transported at temperatures where their partial vapor pressure is near zero. These materials contained Al and Fe compounds. It is well known that a transport involving gaseous iron chlorides or aluminum chlorides is at the origin of this phenomenon. Iron chlorides and aluminum chlorides can form, with chlorides of other metals, compounds of the type $M_xN_yCl_z$ (M=rare earths, precious metals, or base metals, etc. N=Fe, Al, Ga or In). Kanari 1995, reported a complete list of references involving the formation of $M_xN_yCl_z$ compounds. It is clear that chloride compounds can be volatilized at low temperature in the presence of $FeCl_3$ or $AlCl_3$.) Prior to the present invention, it was believed therefore any metals including all PGM species would be volatilized with $FeCl_3$ during carbochlorination of chromites.

This method can thus be used to recover PGM from PGM concentrates and chromites products. In the process of the present invention, the production of a flotation concentrate is advantageously not required, so that ores previously discarded because not amenable to flotation or not presenting sufficient economical value to justify the cost of the production of a flotation concentrate can be brought into production.

According to an other aspect of the present invention, the process can simultaneously remove iron from chromites. Hence, a specific embodiment of the present invention allows a simultaneous increase of the Cr/Fe ratio and PGMs recovery thereby raising the value of the starting chromite product.

According to specific embodiments of the method of the present invention, there is therefore provided a process to extract PGM metals from chromites avoiding the multiple steps of flotation, smelting, converting and autoclave leaches currently used by the PGM industries.

According to specific embodiments of the method of the present invention, the enrichment of chromites and the PGM extraction may be performed simultaneously, therefore increasing the total value of the ore.

According to specific embodiments of the method of the present invention, there is provided a method by which the mineralogical phases carrying the PGM may be converted into chloride complexes highly soluble in a slightly acidic solution.

According to specific embodiments of the method of the present invention, the PGM may be extracted from the chromites with assistance of a catalyst system, which increases the kinetic of the reaction and the solubility of the PGM chemical species obtained by the process.

According to specific embodiments of the method of the present invention, the process includes steps to ensure the secure disposal of the residue.

According to specific embodiments of the method of the present invention, the process includes steps by which the majority of the employed reagents may be recycled.

The present invention is advantageously applicable to chromite ores and different types of concentrates including alluvial chromites and PGM concentrates. If concentrates are used as feed to the invention, the concentrates can be obtained, after grinding of the ore, by the use of standard mineral processing technologies such as jigs, spirals, flotation units and multi-gravity separator.

According to a specific embodiment, there is provided a method for recovering platinum group metals (PGM) from a feed material selected from the group consisting of chromite ore, chromite ore concentrate and PGM concentrate comprising a) carbochlorinating ($Cl_2$,CO) the material having a homogenous grain-size, in a reactor maintained at a temperature of between about 240° C. and about 800° C. in the presence of a $NaCl$-$FeCl_3$ system acting as a catalyst so as to produce a solid material, and a gaseous phase containing $FeCl_3$, whereby the solid material contains certain PGM chlorine salts, and whereby said PGM chlorine salts are soluble in water and HCl solutions of different concentrations; and b) recovering PGMs from the PGM-chlorine-salts-containing solid material.

According to a specific embodiment, there is also provided a method for recovering at least one platinum group metal (PGM) species from a feed product selected from the group consisting of chromite ore, chromite ore concentrate and PGM concentrate comprising the steps of: mixing the feed with at least one salt so as to produce a mixture, whereby the concentration of salt in the mixture is sufficient to convert at least one PGM species into a corresponding PGM chloride salt; and contacting the mixture with gaseous chlorine and CO at a temperature between about 240° C. and 800° C. to induce the conversion of at least one species of PGM into a corresponding PGM chloride salt, whereby said chloride salt of at least one PGM species can be recovered. In a more specific embodiment, the temperature is between about 250° C. and about 800° C. In a more specific embodiment, the temperature is between about 350° C. and about 800° C. In a more specific embodiment, the temperature is between about 500° C. and about 800° C. In a more specific embodiment, the temperature is between about 500° C. and about 720° C. In a more specific embodiment, the temperature is between about 600° C. and about 800° C. In a more specific embodiment, the temperature is between about 620° C. and about 800° C. In a more specific embodiment, the temperature is between about 650° C. and about 800° C. In a more specific embodiment, the temperature is between about 660° C. and about 800° C. In a more specific embodiment, the temperature is between about 500° C. and about 720° C. In a more specific embodiment, the carbochlorination is performed at a flow rate of at least 20 ml/min. In a more specific embodiment, the at least one salt is selected from the group consisting of NaCl, KCl and MgCl2 and a combination thereof. In a more specific embodiment, the salt is NaCl. In a more specific embodiment, NaCl forms at least about 5% w/w of the mixture. In a more specific embodiment, In a more specific embodiment, NaCl forms about 5% to about 20% w/w of the mixture.

There is also provided a method for simultaneously recovering at least one platinum group metal (PGM) species from a chromite product selected from the group consisting of chromite ore and chromite ore concentrate and increasing the Cr/Fe ratio of the chromite product comprising the steps of: mixing the feed with at least one salt so as to produce a mixture, whereby the concentration of salt in the mixture is selected to induce the selective extraction of iron and is sufficient to convert at least one PGM species into a corresponding PGM chloride salt; and contacting the mixture with gaseous chlorine and CO at a temperature of between about 240° C. and 750° C. so as to 1) induce the formation of a thin film of a melt around the chromite product, 2) promote the selective chlorination of iron and 3) convert at least one PGM species into a corresponding PGM chloride salt, whereby at least one PGM species chloride salt is recovered and an iron impoverished chromite product is yielded having an increased chromite to iron ratio as compared to that of the chromite product. In a more specific embodiment, the at least one salt is selected from the group consisting of NaCl, KCl and MgCl2 and a combination thereof. In a more specific embodiment, the at least one salt is in a concentration of about 5% w/w to about 10% w/w in the mixture. In a more specific embodiment, the at least one salt is NaCl in a concentration of about 5% w/w to about 10% w/w in the mixture. In a more specific embodiment, the at least one salt is NaCl in a concentration of about 5% w/w in the mixture. In a more specific embodiment, the step of chlorinating the mixture is performed with a chlorine flow rate of at least about 60 ml/min.

In a more specific embodiment, the step of chlorinating the mixture is performed with a chlorine flow rate of at least about 200 ml/min. In a more specific embodiment, the temperature is between about 250° and about 720° C. In a more specific embodiment, the temperature is between about 670° and about 720° C. In a more specific embodiment, the $Cl_2/CO$ ratio is between about 0.5 and about 1.5.

According to specific embodiments of the methods of the present invention, the methods further comprises one or more of the following steps or characteristics: the mixture is dried before chlorination; $N_2$ is used as a carrier gas during chlorination; the duration of the chlorination is about 30 minutes to about 2 hours, or more specifically, the duration is about 2 hours.

According to a very specific embodiment enabling the simultaneous extraction of PGMs and increasing the Cr/Fe ratio, the method of the present invention may comprise the following steps.

a) Obtaining a feed material selected from the group consisting of chromite ore, chromite ore concentrate and PGM concentrate. The size of the feed material used depends on the degree of liberation of the chromite ore or concentrate or PGM concentrate grain-size in the matrix from which it is extracted;

b) contacting the feed with at least one salt to yield a mixture having a salt concentration of about 5% (w/w) to about 10% (w/w), the at least one salt acting as a catalyst for the chlorination reactions. The NaCl concentration used is also sufficient to convert PGM species into soluble PGM chloride salts;

c) drying and/or pre-heating the treated feed to ensure a substantially complete removal of water resulting from the salt addition. The drying step can be carried out at different temperatures and time periods. In specific embodiments, this step is conducted at about 180° C. for about 30 minutes to about 2 hours to yield a dried feed containing salt. In a specific embodiment, the drying step is conducted about 180° C. for 30 minutes.

d) reacting the dried feed from c) with chlorine ($Cl_2$) and carbon monoxide (CO) at a temperature varying from about 240° to about 750° C. in a chlorination reactor, to yield a gaseous $FeCl_{1-3}$ stream and a solid material from which the iron has been extracted, and to convert PGM into PGM chlorides complexes salts. The chlorination reactor is desirably a furnace built with material resistant to chlorine. In specific embodiments, for the chlorination is conducted for a period of time varying from about 30 minutes to about two hours. PGM phases present in the chromites react with $Cl_2$, CO and NaCl to produce PGM chlorides salts that are soluble in water and HCl solutions; and $FeCl_3$ is produced by the reaction $FeO.Cr_2O_3 + 1.5Cl_2(g) + CO(g) \Rightarrow Cr_2O_3 + FeCl_3(g) + CO_2(g)$ and carried outside the reactor by the flow thru of the gaseous phase, and a portion of the PGM chlorine salts are contained in said solid residue, and an other portion of the PGM chlorine salts are contained in the gaseous phase;

e) condensing the $FeCl_3$ gaseous stream obtained from d) to yield a FeCl3 concentrate and a gaseous phase;

f) $FeCl_3$ can be recovered from the $FeCl_3$ concentrate by washing with water or a solution of HCl and yield aqueous $FeCl_3$—$FeCl_3$ being highly soluble in water;

g) contacting the gaseous phase containing certain PGM species (only Os was observed), $Cl_2$ and CO with water or a solution of hydrochloric acid to yield a leached solution and residual chlorine and CO gases. In specific embodiments, the HCl has a molarity varying between about 0.1 an about 3 M HCl. When HCl solutions are employed, only a small quantity of HCl is consumed, the HCl solutions can therefore be recycled if desirable. This step may optimally be conducted under agitation. This extraction of PGMs from the gaseous phase may be conducted simultaneously and in the same tank as the extraction of PGMs from the solid phase;

h) reacting residual chlorine gas with metallic iron scrap and washing water in order to obtain aqueous $FeCl_3$. CO can desirably be burned with air to yield gaseous $CO_2$;

i) neutralizing, from the combined streams of aqueous $FeCl_3$ of f) and h) by adding NaOH in order to obtain aqueous NaCl and an iron hydroxide precipitate. The reaction involved is $FeCl_3(aq)+3NaOH(aq) \Rightarrow Fe(OH)_3(s)+3NaCl(aq)$. This step may optimally be conducted under agitation;

i) separating the NaCl and the iron oxide precipitate to obtain an iron hydroxide cake and a clear NaCl solution, the iron hydroxide cake being disposable in a regulated tailing pound;

j) electrolyzing the NaCl solution of i) to regenerate $Cl_2$, NaOH and $H_2$. Suitable methods may be used such as the chlor-alkali membrane cell process;

l) advantageously, the $Cl_2$ and NaOH generated in step j) may be recycled as reactants for the chlorination and neutralization reactions, and $H_2$ generated in step k) may be recycled as additional combustible for the chlorination reactor;

m) contacting the solid material of step d) with water or a solution of hydrochloric acid. In more specific embodiments, HCl may vary between about 0.1 to about 3 M HCl. This contact may suitably be performed for about 10 to about 20 minutes under agitation. The agitation step may include heating or boiling of the mixture. In a specific embodiment, the digestion is conducted at a temperature of 70° C. Typically, the ratios (w/w) of water/enriched solid material or HCl/enriched solid material vary between about 2.5 to about 50. When HCl solutions are employed, only a small quantity of HCl is consumed, the HCl solutions can be therefore recycled if desirable. Alternatively, the solid material obtained from step d) is contacted, in a similar manner, directly with the leached solution of step g);

n) separating the mixture of step m) to obtain: i) a solid residue showing an increase in its chromium to iron ratio as compared to that of the starting feed and; ii) a leached solution containing dissolved PGM species;

o) recovering PGM species from the leached solutions isolated in steps g) and n) by zinc cementation or by the utilization of appropriate ion exchange resins;

p) advantageously, the HCl solution may be recycled or a HCl 6 M solution regenerated by distillation, this latter solution being used to prepare the HCl solution having a molarity of about 0.1 to about 3 M.

According to a further specific embodiment, there is provided a method for the extraction of PGM from a starting feed selected from the group consisting of chromite ore, chromite ore concentrate and PGM concentrate wherein even when the feed is a chromite product, the extraction of $FeCl_3$ is minimized or is not occurring. This method differs from the above-presented method at least in that: 1) In addition to chromite ore and concentrates, PGM concentrates can be used; 2) There is no reason to believe that there is an upper concentration limit (w/w) for the salt when the Cr/Fe ratio increase is not desirable: there is no reason to believe that salt could be detrimental at certain concentrations to PGMs; 3) The upper temperature limit may be as high as 800° C. (i.e. it is believed that at one point over this temperature, PGM species would progressively be volatilized. The above-mentioned reference of Lalancette and Bergeron, 1996 however appears to indicate however that at 800° C. this phenomenon still does not occur); 3) The reaction $FeO \cdot Cr_2O_3+1.5Cl_2(g)+CO(g) \Rightarrow Cr_2O_3+FeCl_3(g)+CO_2(g)$ is minimised or not occurring so that no $FeCl_3$ is carried outside the reactor by the flow thru of gases; and 4) the steps of condensing and recovering $FeCl_3$ are dispensed of.

In a specific embodiment, the leaching solution of the gaseous phase is used instead of HCl to digest the solid residue and the digestion was performed at 70° C.;

According to a more specific embodiment, the starting feed is a chromite ore.

According to an alternative more specific embodiment, the starting feed is a chromite concentrate obtained by a suitable mineral processing technology.

According to an alternative more specific embodiment, the starting feed is a PGM concentrate obtained by a suitable mineral or metallurgical processing technology such as a flotation concentrates and metallurgical mattes.

Other objects and further scope of applicability of the present invention will become apparent from the detailed description given hereinafter. It should be understood, however, that this detailed description, while indicating preferred embodiments of the invention, is given by way of illustration only, since various changes and modifications within the scope of the invention will become apparent to those skilled in the art.

DESCRIPTION OF SPECIFIC EMBODIMENTS

Figure 1:
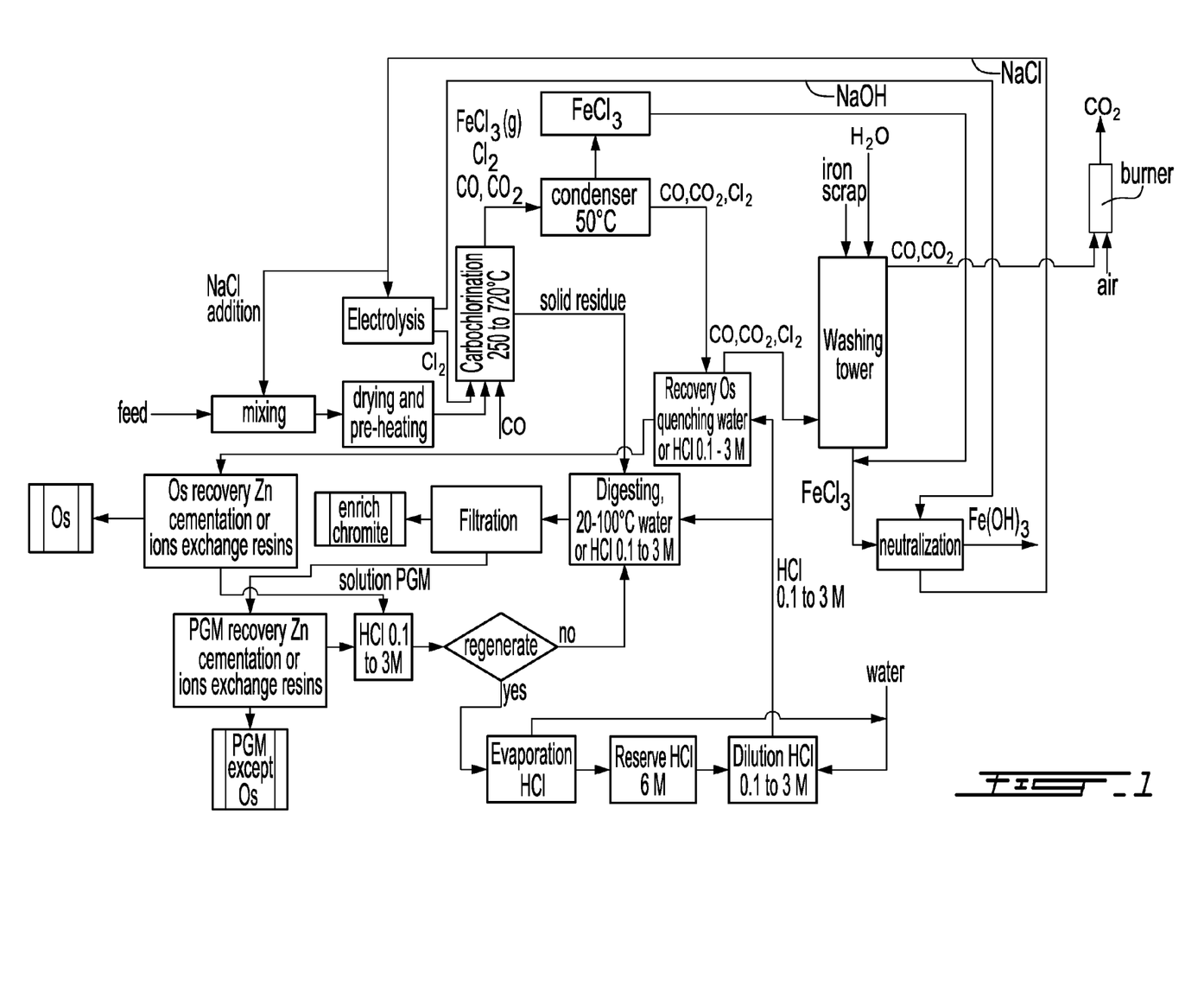
FIG. 1 illustrates a flow diagram of a specific embodiment of the present invention in which the PGM are collected in two separate leaching solutions.
Figure 2:
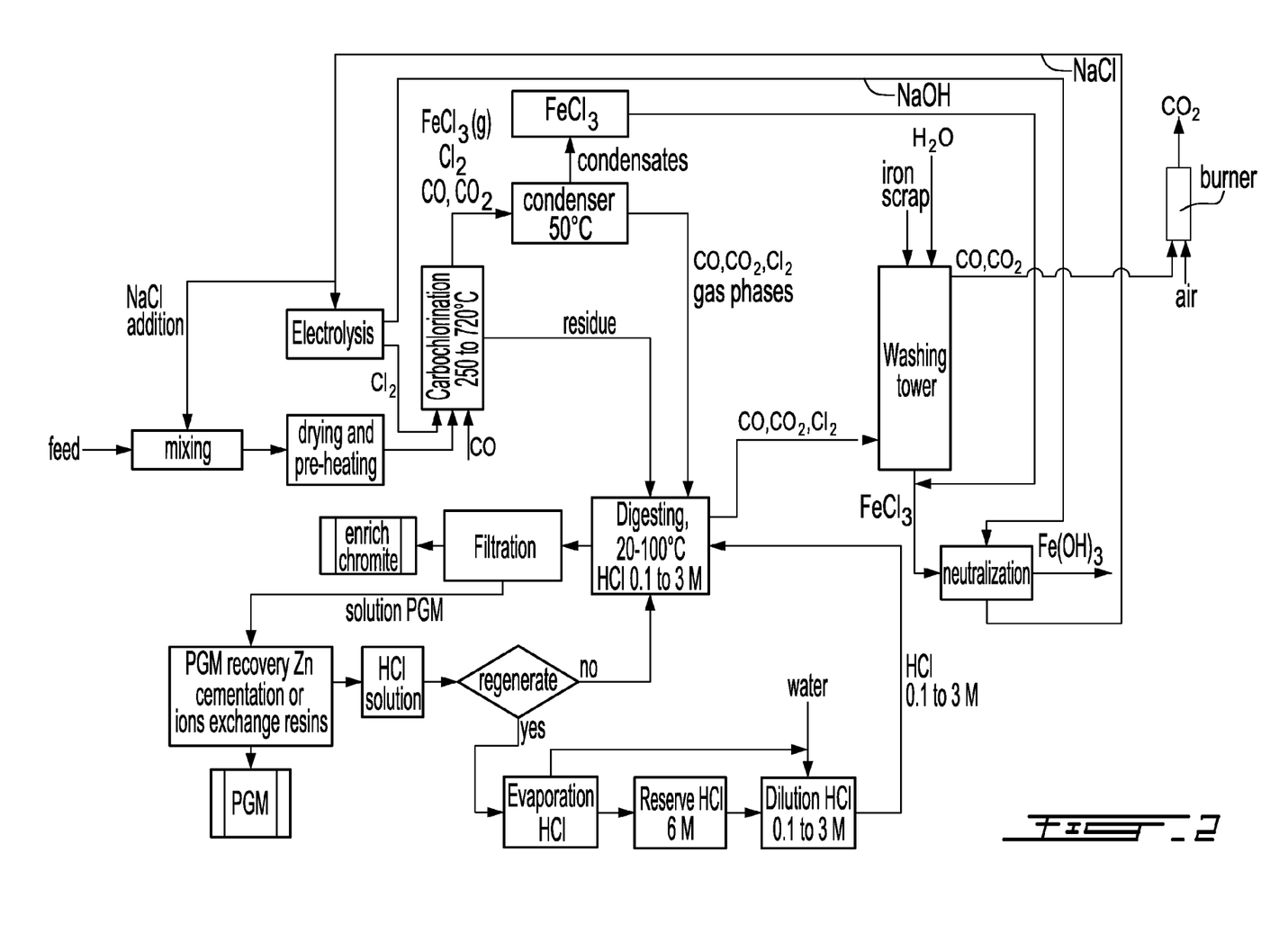
FIG. 2 illustrates a flow diagram of a specific embodiment of the present invention in which the PGM are collected in one leaching solution.

Referring to FIGS. 1 and 2, the feed to the process can be the direct ore or an ore concentrate obtained from an appropriate mineral processing technology. In Examples presented below, the feed used is from a massive chromite layer obtained from the Menarik deposit (James Bay, Quebec). The average mineralogy of 29 massive chromite layers of the Menarik Complex is: chromite 45%, chlorite 32%, serpentine 13%, magnetite 3%, talc 1%, hornblende 4%, and traces of sulfides. The sample was hand-picked from the chromite mineralized zone Cr-3 and subsequently ground to 125 μm.
Mixing(2)

The ore or concentrate was mixed with a solution of NaCl to obtain, after drying, a feed containing 5% NaCl (w/w) by weight. The combined action of NaCl and $FeCl_3$, created during the carbochlorination step, caused the formation of a eutectic point in the system $NaCl-FeCl_3$. This mixture acted as a catalyst for the chlorination reactions. In general, the salt addition produces a thin liquid film around each grain. This liquid film contains a strong chlorination agent such as: 1) $NaFeCl_4$ resulting from the reaction of $FeCl_3$ with NaCl or 2) dissolved iron species acting as chlorine supplier to the chlorination sites. Hence, Zao, Tian and Duan (1990, Metallurgical Transactions B, 21B, pp. 321-330) have reported from experiments in molten salt bath that the chorine transport to the reaction sites proceeded via the reaction: $FeCl_{2(melt)}+0.5Cl_{2(gas)}=FeCl_{3(melt)}$; the chlorine pressure decreasing rapidly at the reaction site, causing the decomposition of $FeCl_3$ and formation of $FeCl_2$ which, by reaction with external chlorine, turns again to $FeCl_3$. In practice, the carbochlorination reactions occur in a micro molten salt bath.

In the specific case of PGM species, the addition of NaCl also produced PGM chloride salts of the type $Na_2PtCl_6$, Na$_2$PdCl$_4$, Na$_3$RhCl$_6$, Na$_2$IrCl$_6$, etc., which are highly soluble in water or in diluted hydrochloric acid (Pascal, 1958, Nouveau traité de chimie minérale, Masson et Cie, Tome 19, pp. 949). It is understood from the person of ordinary skill in the art that other types of salts such as KCl and MgCl$_2$ can be used to produce a catalytic system for the carbochlorination of feed materials such as chromite ores or concentrates of PGM concentrates.

Drying and Pre-Heating (4)

The drying step ensures a complete removal of water resulting from the salt addition and can be carried out at different temperatures and time periods. In Examples presented below, the mixture was dried at 180° C. for 30 minutes. After cooling, the charge was transferred in the chlorination reactor and pre-heated at the selected reaction temperature.

Carbochlorination

Pascal, 1958 reports that all PGM in their pure metallic forms react with gaseous chlorine to form chlorides compounds at temperature generally above 240° C. He reports that that the pure metallic forms of platinum forms a PtCl$_2$ at 240° C., palladium forms PdCl$_2$ at 300° C., rhodium forms RhCl$_3$ at 300° C., iridium forms IrCl$_3$ at 600° C., ruthenium forms RuCl$_3$ at 350° C. and osmium forms OsCl$_4$ at 650° C. Highly soluble metallic salts of PGM metals can then be derived from the chlorides compounds when these are contacted with NaCl. Prior to the present invention, it was not known however whether stable chloride salts could be produced from the various mineralogical forms under which PGM species are found in ores or concentrates. There are literally tens of such forms existing for each PGM species and new ones are regularly identified. Hence, in ores and concentrates, platinum has been found to exist as (Pt,Pd)S; (Pt,Pd,Ni)S for instance, palladium has been found to exist as Pd$_3$As; Pd$_{3-x}$(Te,Sn,Sb) for instance, rhodium has been found to exist as Rh$_{17}$S$_{15}$; (Rh,Pt,Ru,Ir)AsS for instance, iridium has been found to exist as IrAs$_2$;IrAsS for instance, ruthenium has been found to exist as RuAs$_2$; RuS$_2$ for instance, and osmium has been found to exist as OsAs$_2$; OsAsS for instance.

The catalytic system previously described in the present application involving a molten salt bath of NaCl/FeCl$_3$ containing dissolved gaseous Cl$_2$ was surprisingly found to form metallic salts of PGM. The formation of PGM chloride salts from PGM species found in ores and concentrates was found to be desirable to avoid the formation of volatile chloride such as PtCl$_2$ and PdCl$_2$ and their escape in different process streams. The presence of a salt therefore during the carbochlorination step desirably ensures the conversion of PGM species into corresponding PGM chloride salts rather than their conversion into insoluble species. The examples presented below indicate that, except for osmium, the metallic salts of PGM do not escape from the molten salt bath and therefore are not present in other process streams.

During the carbochlorination step, the feed is contacted with chlorine, CO and NaCl so as to promote the formation of the PGM metallic salts. The carbochlorination step is conducted in a horizontal static furnace at temperature varying from 240° C. to 800° C. According to the present invention, the chlorination reactions enabling PGM recovery can advantageously be performed according to two modes.

PGM Converted into Metallic Salts with Simultaneous Extraction of Gaseous FeCl$_3$ In the first mode, the PGM are converted into metallic salts with simultaneous extraction of gaseous FeCl$_3$. In such a case, the carbochlorination conditions are set to optimize the rate of FeCl$_3$ removal. optimally these conditions involve temperature in the range of about 670° C., Cl$_2$/CO ratio of about one and a relatively high flow rate of about 60 ml/min to about 220 ml/min for both Cl$_2$ and CO. It is to be noted that a flow rate lower than 60 ml/min may also achieve a certain increase in the Cr/Fe ratio but it is not optimal. It has been shown that this increase is close to zero when a flow rate of 20 ml/min is used. The precise flow rate at which the Cr/Fe remains stable may be determined routinely in the art in each specific reactor in which the carbochlorination is performed. It is also to be noted that there is no known risk of increasing the chlorine flow rate. Of course, it is advantageous to keep the flow rate (i.e. the quantity of chlorine used) as low as possible to decrease costs. See also co-pending application no PCT/CA2004/000165 for more details on optimal conditions for increasing Cr/Fe ratio of chromites.

In accordance with this mode, the chemical reaction desirably occurring during carbochlorination is the following:

FeO.Cr$_2$O$_3$+1.5Cl$_2$(g)+CO(g)$\Rightarrow$Cr$_2$O$_3$+FeCl$_3$(g)+CO$_2$(g)

The $\Delta G°_T$ versus temperature of this reaction was calculated using the HSC™ software of Outokumpu. They are presented at FIG. 3 of co-pending application no. PCT/CA2004/000165. For the range of temperatures considered, the $\Delta G°_T$ values were inferior to −150 Kjoules. This demonstrates the thermodynamic feasibility of the reaction. According to the above reaction, the iron contained in the chromite product reacts with Cl$_2$ to form FeCl$_3$. At the temperature range described in co-pending application no. PCT/CA2004/000165, 250° to 673° C., FeCl$_3$ is in a vapour state. Because of the continuous flow of gas passing through the reactor, FeCl$_3$ is carried outside the reactor, where it is condensed. An acceptor such as CO(g) for the oxygen liberated during the chlorination reaction may be added to maintain reducing conditions. The addition of CO(g) limits the probability that the reaction 2FeCl$_3$+3/2O$_2$=Fe$_2$O$_3$+3Cl$_2$ will occur. Thereby, no detectable precipitation of unwanted solid hematite takes place in the reactor.

Another significant reaction occurring according to an embodiment of the present invention is the formation of ferrous chloride FeCl$_2$ during the carbochlorination phase. Ferrous chloride (FeCl$_2$) having a high melting point of 670° C., hence a temperature higher than that used during the carbochlorination according to certain embodiments of the present invention, a rapid chlorination of FeCl$_2$ into ferric chloride (FeCl$_3$) according to the reaction 2FeCl$_2$+Cl$_2$$\Rightarrow$2FeCl$_3$(g) may be desirable in these specific embodiments in order to avoid the production of a diffusion barrier by the formed solid ferrous chloride. This barrier may decrease the chlorine access to the reaction sites. Rhee and Shon (1990, Metallurgical Transactions B, 21B, pp. 321-330) reported data on the carbochlorination of ilmenite (FeO.TiO$_2$), a product presenting similarities to chromites when chlorinated. They showed that the kinetics follow a pore-blocking rate law. Zhao, Tian and Duan (1990, Metallurgical Transactions B, 21B, 131-133) studied the equilibrium between ferrous and ferric chloride in molten chloride salts. They concluded on the catalytic effect of the combination of salt and iron chloride and also on the volatilization of iron from the salt melt. Their data indicated that volatilization of iron as FeCl$_3$ is maximized when the NaCl content is high. None of these conditions were tested before on chromites.

Hence, in this first mode of the present invention, carbochlorination is performed with a salt such as NaCl, KCl and MgCl$_2$ to produce a catalytic melt when NaCl combines with FeCl$_2$ and/or FeCl$_3$ so as to increase the volatilization (the removal) of iron as gaseous FeCl$_3$ from the carbochlorination reactor.

When the carbochlorination temperature was reached in the chlorination reactor (5) a mixture of $Cl_2$ and CO and, in specific embodiments, $N_2$ (not shown) was introduced in the reactor so as to induce carbochlorination. After a few minutes, $FeCl_3(g)$ (5) was expelled from the reactor. According to specific embodiments described Examples in co-pending application no. PCT/CA2004/000165, the temperature was varied from 250° to 720° C. However because of thermodynamics rules, it is expected that this temperature may be increased at least up to 750° C. without loosing the selectivity of the chlorination towards iron. In the present invention, chlorine and carbon monoxide were used on a 1/1 basis. In the co-pending application, the flow rate was maintained at 220 ml/min. $N_2$ is not believe to play a role in any reaction involved in the method and may accordingly be dispensed of. In the co-pending application, where $Cl_2$, CO, and $N_2$ were used, the flow rates of the different gases were varied as well as the weight % of salt additives. The co-pending application indicated that the optimal $Cl_2$/CO flow rate ratio is between about 0.5 and about 1.5. Interesting results are nevertheless obtained outside this range but the Cr/Fe obtained progressively decreases with ratios below 0.5 or above 1.5.

PGM Converted into Metallic Salts with Minimal Extraction of Gaseous $FeCl_3$

In the second mode, the carbochlorination conditions are optimized for the conversion of PGM to metallic salts. In this case, the expulsion of $FeCl_3$ outside the reactor was minimised by using a low flow rate of about 20 ml/min for both $Cl_2$ and CO. To ensure optimal conversion of the PGM, the feed was maintained in contact with $Cl_2$ and CO for about 2 hours. The carbochlorination temperature is varied from about 240° C. up to about 800° C. depending on the nature of the ores or concentrates, although there is no known advantage for using a temperature higher than that at which all PGM species are dissolved, namely about 660° C. Indeed PGM species recovery was observed to be equivalent at temperatures of 660° C. and 720° C. (see Examples 1 to 4 below).

The chlorination reactions for all Examples presented below were conducted in a simple horizontal static furnace. Usually, at industrial scale, chlorination is realized in fluidized bed reactors constructed of acid resistant bricks enclosed in a metal shell. Since the salt addition results in the formation of a thin liquid film layer around the chromite grains, which increases their adherence properties, it may be desirable to avoid fluidized reactor in order to avoid problems associated with grains agglomeration and bed sedimentation. Alternatives to fluidized bed reactor include a vertical static reactor and a horizontal rotating reactor.

Other embodiments of the present invention may include the use of solid reducing agents like coal or coke instead of CO which may be onerous for industrial scale methods. When coal and coke are used, they react with oxygen to form CO so that the end result is similar to that obtained when CO is directly introduced in the chlorination reactor. Pelletizing-sintering procedures, similar to the ones employed in the ferrochromium industry, can be performed before the chlorination step.

After the chlorination reaction, the solid upgraded chromites minerals (6) contained in the reactor were dumped. Depending on the duration of the reaction, the gas flow rate, the salt additives, the $Cl_2$/CO ratio, the chlorinated solid residue showed an increase in its chrome to iron ratios and variable proportions of PGM species have been converted into metallic salts.

Condenser (8)

Gaseous $FeCl_3$ (10) exited continuously the reactor during the reaction and the abrupt temperature drop outside the reactor caused its fast condensation in the top section of the condenser. The condenser was placed at an adequate distance from the furnace so as to keep its temperature below 50° C. so as to ensure $FeCl_3$'s condensation. $FeCl_3$ is highly soluble in water. A small volume of water was added to the condenser apparatus to wash the solid $FeCl_3$. The $FeCl_3$ rich aqueous solution accumulated at the base of the condenser and was directed into a reservoir for subsequent neutralization. The other gases leaving the reactor were essentially $Cl_2$, CO, $CO_2$ (12) and $N_2$(not shown). These gases were apparently not affected by the presence of the condenser (8) and flew through it without experiencing any detectable change in their compositions or states and exited the condenser.

Digesting Reactor (38)

The chlorinated solid residue was then placed in contact with water or a HCl solution having a molarity of about 0.1 to about 3 M in a digester (38). The pulp was agitated for about 15 minutes. When desirable, the solution was heated or boiled during the agitation period and the digester was equipped with a condensing system. The HCl solution was alternatively replaced by water. During the carbochlorination step, the osmium value was transported in the vapor phase and was not affected by the condensation of $FeCl_3$.

Quenching of the Vapor Phases (40)

The Os exited therefore the condenser (8) and was recovered by quenching the vapor phases, mainly composed of $Cl_2$, CO, $CO_2$ and $N_2$, with water or a HCl solution having a molarity of about 0.1 to about 3 M.

Filtration and PGM Recovery (42)

After the digestion procedure, the digester pulp was filtered. The solution containing the dissolved PGM salts was subjected to Zn cementation or an ion exchange procedure (44) to recover a PGM concentrate (46). The solid phase (48) isolated from the filtration process showed an increase in its chromium to iron ratio and could be commercialized, among other things, as an enriched chromite feed for a ferrochromium furnace.

The Os contained in the quenching solution was recovered by Zn cementation or an ion exchange procedure (50).

In an alternate use of the process, the solution containing the quenched Os was used to digest the solid residue obtained at the end of the carbochlorination step (52).

Acid Regeneration (54)

The process used diluted HCl. Only a slight quantity of HCl was consumed in the process. Hence, the HCl digesting solution could be recycled to the digester (38). The HCl solution was re used until pH rose to a value diminishing the PGM solubility. A 6 M HCl solution (58) was regenerated by distillation (56). The pH of the digesting solution was adjustable to the required value by water dilution (60).

Washing Tower (14) and Gas Treatment $Cl_2$, CO, $CO_2$ and $N_2$ exiting the chlorination reactor (5) were routed toward a washing tower (14). Scraps of metallic iron(16) in the millimeter range were placed in the tower (14) and sprayed with a small quantity of water (18) in order to keep wet the iron metallic surfaces. This arrangement favored the reaction $Fe(s)+3/2Cl_2 \Rightarrow FeCl_3(aq)$ which consumed the unreacted $Cl_2$. After the reaction, $FeCl_3$ was present as a solute (20) in $H_2O$. CO and $CO_2$ (22) percolated up and exited the washing tower near the top. CO was burned as $CO_2$ (24) in an after burner (26) unit. If necessary, by environmental regulations, the scrubbing of $CO_2$ could be achieved by an existing complementary technology (not shown). The aqueous $FeCl_3$ solution flew out at the base of the washing tower to be routed toward the neutralization reservoir.

Neutralization

The aqueous $FeCl_3$ solutions (10) and (20) coming from the condenser (8) and the washing tower were pumped in a neutralization reservoir (28). A solution of NaOH (not shown) was added to the reservoir. The ferric chloride reacted with NaOH to produce $Fe(OH)_3$ (30) according to the reaction:

$$FeCl_3(aq) + 3NaOH(aq) \Rightarrow Fe(OH)_3(s) + 3NaCl(aq)$$

After completion of the reaction, the solid amorphous iron oxides were isolated from the liquid phase by an appropriate solid-liquid separation such as centrifugation or press filtration (31). The filtration cake was discharged to the tailings. The aqueous NaCl solution (32) was directed to an electrolysis cell (34).

Electrolysis

The NaCl solution (32), obtained from the neutralization step of the process, is electrolyzed by a chlor-alkali membrane cell process. The reaction involved is:

$$2NaCl(aq) + 2H_2O \Rightarrow H_2(g) + Cl_2(g) + 2NaOH(aq)$$

The gaseous $Cl_2$ and aqueous NaOH generated by the reaction are recycled in the process. The $Cl_2$ is returned (36) to the carbochlorination reactor (5) and the aqueous NaOH is directed (31) in the neutralization reservoir (28). The $H_2(g)$ produced (not shown) by this reaction can be employed as the main energy source or an additional energy source for the carbochlorination reactor (5). External supplies of NaCl can be used if needed.

Any means for routing, transporting and transferring solid, gas, liquid and pulp are within the scope of these inventions. The present invention is described in further details by the following non-limiting examples.

EXAMPLES

The following detailed Examples are presented as specific illustrations of the presently claimed invention. It should be understood, however, that the present invention is not limited to the specific details set forth in these Examples.

The experiments were performed on a massive chromitite layer obtained from the Menarik deposit (James Bay, Quebec). The average mineralogy of 29 massive chromite layers of the Menarik Complex is: chromite 45%, chlorite 32%, serpentine 13%, magnetite 3%, talc 1%, hornblende 4% and traces of sulfides. The sample was hand-picked from the chromite mineralized zone Cr-1 and subsequently grinded to about 125 μm and homogenized. The individual concentrations of Pd, Pt, Ir, Rh, Ru and Os contained in the samples were analyzed by a nickel sulfide fire-assay procedure adapted to chromite followed by a finish by inductively coupled plasma mass spectrometry, ICP-MS. These concentrations were used as a reference point for the calculation of the PGM recovery during the carbochlorination experiments.

The major and complementary trace elements were analyzed by inductively coupled plasma atomic emission spectroscopy, ICP-AES, after a fusion procedure specifically applicable to chromite ore.

The implementation and results of the examples provided herein are summarized in Table 1. The carbochlorination experiments where carried out in a 65 cm in length horizontal cylindrical furnace equipped with a type K pyrometer linked to a thermostat controller. Usually, a 10 grams sample was placed in a ceramic boat and inserted in a silica-fused tube. The beaker-tube assembly was then introduced in the furnace. A glass tube was fitted to the tube exiting the furnace using a Teflon™ joint to extend the tube 0.5 meter outside the furnace. The condensate (condensate) is present in this external section of the tube. The vapor phase (gas phase), still present in the extended tube, at room temperature, were contacted, in a vessel, with either water or 0.1 M to 3 M HCl. After the carbochlorination step, the solid contained in furnace (the residue) and the condensate were digested in either water or 0.1 M to 3 M HCl solutions. The residue, representing the solid present in the furnace after the experiment, the condensate, representing the gas condensed on the side of the tube and the gas phase, representing the vapor reaching the quenching vessel were analyzed separately for the PGM, see Table 1 and FIGS. 1 and 2.

It is to be noted that the percentages of the various PGM species found in the ore used for the Examples presented herein are representative of the relative proportions of each PGM species generally found in other ores and concentrates. Hence platinum and palladium often constitute the major part of all PGM species found in ores and concentrates. The carbochlorination temperature may therefore in accordance with specific embodiments of the present invention be adjusted to enable the dissolution of only certain PGM species found in the ore.

TABLE 1

Examples of the recovery of PGM from the carbochlorination experiments.

| Notation | Remarks | $Cl_2$ ml/min | CO ml/min | $Cl_2$/CO | T °C. | Time H | Pd ppb | Pt ppb | Ir ppb | Os ppb | Rh ppb | Ru ppb |
|---|---|---|---|---|---|---|---|---|---|---|---|---|
| CR-1a, NiS | Nickel sulphide fire-assay | | | | | | 1019 | 274 | 17 | 15 | 79 | 55 |
| CR-1b, NiS | Nickel sulphide fire-assay | | | | | | 1208 | 317 | 20 | 18 | 87 | 61 |
| CR-1d, NiS | Nickel sulphide fire-assay | | | | | | 1281 | 314 | 22 | 20 | 96 | 68 |
| CR-1 average | Nickel sulphide fire-assay | | | | | | 1169 | 301.7 | 19 | 18 | 87 | 61 |
| PGM-1, residue | 5% NaCl, 3 M HCl | 220 | 220 | 1 | 720 | 2 | 1122 | 248 | 31 | 2.9 | 94 | 114 |
| PGM-1, condensate | 5% NaCl, 3 M HCl | 220 | 220 | 1 | 720 | 2 | ND | ND | ND | ND | ND | ND |
| PGM-1, gas | 5% NaCl, 3 M HCl | 220 | 220 | 1 | 720 | 2 | 47 | 17 | <1 | 69 | <1 | <0.6 |
| PGM-1, TOTAL | 5% NaCl, 3 M HCl | 220 | 220 | 1 | 720 | 2 | 1169 | 265 | 31 | 72 | 94 | 114 |
| PGM-2, residue | 5% NaCl, 3 M HCl | 20 | 20 | 1 | 660 | 2 | 1091 | 320 | 21 | 1.7 | 84 | 85 |
| PGM-2, condensate | 5% NaCl, 3 M HCl | 20 | 20 | 1 | 660 | 2 | ND | ND | ND | ND | ND | ND |
| PGM-2, gas | 5% NaCl, 3 M HCl | 20 | 20 | 1 | 660 | 2 | 11 | 8 | <1 | 45 | <1 | <0.6 |
| PGM-2, TOTAL | 5% NaCl, 3 M HCl | 20 | 20 | 1 | 660 | 2 | 1102 | 328 | 21 | 47 | 84 | 85 |
| PGM-3, residue | 5% NaCl, digestion hot water | 200 | 200 | 1 | 660 | 2 | 624 | 149 | 25 | 2.3 | 69 | 45 |

TABLE 1-continued

Examples of the recovery of PGM from the carbochlorination experiments.

| Notation | Remarks | $Cl_2$ ml/min | CO ml/min | $Cl_2$/CO | T °C. | Time H | Pd ppb | Pt ppb | Ir ppb | Os ppb | Rh ppb | Ru ppb |
|---|---|---|---|---|---|---|---|---|---|---|---|---|
| PGM-3, condensate | 5% NaCl, digestion hot water | 200 | 200 | 1 | 660 | 2 | ND | ND | ND | ND | ND | ND |
| PGM-3, gas | 5% NaCl, digestion hot water | 200 | 200 | 1 | 660 | 2 | 28 | 4 | <0.8 | 5 | <0.5 | <0.7 |
| PGM-3, TOTAL | 5% NaCl, digestion hot water | 200 | 200 | 1 | 660 | 2 | 652 | 153 | 25 | 7.3 | 69 | 45 |

ND: Not detected
Cr-1a to Cr-1d are sub-samples of the same starting ore.
PGM-1 to PGM-3 are different carbochlorination experiments.

TABLE 2

PGM recovery, %.

| Notation | Remarks | Cl2 ml/min | CO ml/min | Cl2/CO | T °C. | Time H | Pd % | Pt % | Ir % | Os % | Rh % | Ru % |
|---|---|---|---|---|---|---|---|---|---|---|---|---|
| PGM-1, residue | 5% NaCl, 3 M HCl | 220 | 220 | 1 | 720 | 2 | 96 | 82 | 160 | 16 | 108 | 186 |
| PGM-1, condensate | 5% NaCl, 3 M HCl | 220 | 220 | 1 | 720 | 2 | ND | ND | ND | ND | ND | ND |
| PGM-1, gas | 5% NaCl, 3 M HCl | 220 | 220 | 1 | 720 | 2 | 4 | 6 | 0 | 388 | 0 | 0 |
| PGM-1, TOTAL | 5% NaCl, 3 M HCl | 220 | 220 | 1 | 720 | 2 | 100 | 88 | 160 | 404 | 108 | 186 |
| PGM-2, residue | 5% NaCl, 3 M HCl | 20 | 20 | 1 | 660 | 2 | 93 | 106 | 108 | 10 | 96 | 139 |
| PGM-2, condensate | 5% NaCl, 3 M HCl | 20 | 20 | 1 | 660 | 2 | ND | ND | ND | ND | ND | ND |
| PGM-2, gas | 5% NaCl, 3 M HCl | 20 | 20 | 1 | 660 | 2 | 1 | 3 | 0 | 253 | 0 | 0 |
| PGM-2, TOTAL | 5% NaCl, 3 M HCl | 20 | 20 | 1 | 660 | 2 | 94 | 109 | 108 | 262 | 96 | 139 |
| PGM-3, residue | 5% NaCl, digestion hot water | 200 | 200 | 1 | 660 | 2 | 53 | 49 | 129 | 13 | 79 | 73 |
| PGM-3, condensate | 5% NaCl, digestion hot water | 200 | 200 | 1 | 660 | 2 | ND | ND | ND | ND | ND | ND |
| PGM-3, gas | 5% NaCl, digestion hot water | 200 | 200 | 1 | 660 | 2 | 2 | 1 | 0 | 28 | 0 | 0 |
| PGM-3, TOTAL | 5% NaCl, digestion hot water | 200 | 200 | 1 | 660 | 2 | 56 | 51 | 129 | 41 | 79 | 73 |

TABLE 3

Major elements, Residue PGM-1, starting chromite.

| Sample | Total % | Al2O3 % | CaO % | Fe2O3T % | K2O % | MgO % | MnO % | Na2O % | P2O5 % | S % | SiO2 % | TiO2 % | Cr2O3 % |
|---|---|---|---|---|---|---|---|---|---|---|---|---|---|
| Residue PGM-1 | 100.0 | 19.0 | .288 | 3.23 | .0870 | 17.5 | .213 | .357 | <0.21 | .0730 | 3.21 | .319 | 54.6 |
| Starting chromite | 101.6 | 12.7 | .166 | 25.3 | .0450 | 11.2 | 1.03 | .218 | <0.17 | .264 | 1.87 | .352 | 48.2 |

Example 1

PGM Extraction with Simultaneous Increase of Cr/Fe Ratio of Chromite Feed

This example demonstrates that by using carbochlorination, in conditions promoting the formation of a large quantity of $FeCl_3$, substantially all PGM may be recovered from the residue, except Os, which may be recovered from the gas phase. According to a specific embodiment, the process of the present invention may recover the PGM contained in these two streams.

A ten-gram sample of the chromite CR-1 was mixed with a NaCl solution. After drying, the salt content of the mixture was 5% by weight. This material was loaded in the reactor and the temperature was raised to 720° C. in the presence of $N_2$. Once the reaction temperature was reached, 200 ml/min of $Cl_2$ and 200 ml/min of CO were flow through the reactor. The mixture of gas was maintained in contact with the solid for 2 hours. Ten minutes after the introduction of the gas mixture, the evolution of $FeCl_3$ exiting the reactor and condensing outside the reactor in the condenser area was noted. The gas phase escaping the condenser area was quenched in a 3 M HCl solution. No precipitate was noted in the quench vessel, although a red-yellow coloration appeared in the HCl solution. This quenched solution was used as a trap for the PGM transported in the gas phase. During the run, the $FeCl_3$ evolution continued and no reduction was observed in the rate of formation of $FeCl_3$.

After the two hours run, the reactor was cooled down to room temperature. Nitrogen was flushed in to the reactor during the cooling period. The solid left in the reactor, the residue, was transferred in a glass beaker and on a hot plate. One hundred ml of a 3 M HCl solution was added to the residue. The mixture was agitated for 15 minutes at 70° C. After the agitation period, the mixture was filtered and the resulting clear solution was analysed for PGM by ICP-MS. The solid condensate (mostly $FeCl_3$) was recovered from the condenser area by washing with 3 M HCl. The condensate was digested using exactly the same digesting procedure as the one used for the residue. The quenching 3 M HCl solution used as a trap for the PGM contained in the gas phase was analysed directly for the PGM.

Analysis of the condensate fraction by ICP-MS for the PGM did not lead to consistent results, most of the concentrations of PGM being below or close to detection limits. The poor detection limits were related to a matrix effect created by the high concentration of $FeCl_3$ in the analysed solution. Therefore, the presence of PGM in this particular fraction was estimated from the mass balance of the total PGM content.

The distribution of the PGM in the residue and in the gas phase are presented at the Table 1 for the sample noted PGM-1. As may be seen from Table 1, the sums of the PGM for the residue and the gas phase were: Pd 1169 ppb, Pt 265 ppb, Ir 31 ppb, Os 72 ppb, Rh 94 ppb and Ru 114 ppb. The PGM concentrations obtained from the nickel sulphide fire-assay, reported at the Table 1, can be used as the 100% recovery mark. Hence, the sums of PGM values in the residue and the gas phases were recalculated as percent recovery at Table 2. The experimental error, including sample homogeneity, is in the order of ±15%. For Pd, Pt and Rh the recoveries are within 100±15% limits and are considered here as complete. For Ir, Ru and Os the recoveries exceeded 100±15% limits. Os is considered as being loss as $OsO_4$ during the fusion stage in the NiS fire-assay method. Therefore, it is not surprising that the recovered value by carbochlorination exceeded by a factor 4 the expected value in the starting ore. For Ir and Ru, the carbochlorination process appears to be a superior approach to NiS fire-assay for achieving complete dissolution of these two specific PGM in chromites. Losses of Ru as $RuO_4$ are also reported during the fusion stage. Nickel sulphide fire-assay shows limits when applied to chromite and often the slag must be refused to achieve complete recovery of PGM.

As may be seen from Tables 1 and 2, the process, according to specific embodiments, is able to achieve complete extraction of substantially all PGM from the feed. PGM are leached from the residue and gas phase streams, losses of PGM to the condensate stream appear to be negligible.

One application of the present invention is a situation in which a simultaneous extraction of PGM is sought out with an increase in the chromium to iron ratio of the reacted chromite. In such a situation the economic value of the PGM is combined to the value of a chromite showing a high chromium to iron ratio. The carbochlorination conditions used in this example produces a high increase in the chromium to iron ratio of the reacted chromite. Hence, before the carbochlorination, the Cr to iron ratio of the chromite was determined at 1.9 after the carbochlorination step, the chromium to iron ratio reached 16.9, see Table 3 for major elements analysis.

Therefore, Tables 1 to 3 demonstrate that the process, according to specific embodiments is able to recover substantially all the PGM from a chromite ore. The PGM are only present in the residue and the gas phase (Os only) streams. The process can be run concurrently with a large removal of $FeCl_3$. The removal of $FeCl_3$ produces an increase in the chromium to iron ratio of the chromite used as a feed to the process.

Example 2

PGM Extraction without Substantial Modification of Cr/Fe Ratio of Chromite Feed This example demonstrates that the extraction of PGM may be substantially complete in conditions where the carbochlorination does not involve a large loss of $FeCl_3$ and therefore the chromium to iron ratio of the chromite feed is not substantially modified after the process. Such a situation occurs in the case where only the extraction of the PGM from the feed is required.

Because the PGM are present in the sample in trace amount, the consumption of $Cl_2$ required for the conversion of PGM carrying phases to PGM chloride salts is minimal. The reduction in $Cl_2$ consumption has an important impact on the process commercial viability.

These conditions also shorten the subsequent metallurgical steps since the quantity of $FeCl_3$ formed is very small and condensation, neutralisation and disposition as $Fe(OH)_3$ is simplified.

The conditions used and steps followed in this experiment differed from those disclosed in Example 1 only in that the reactor and the temperature was raised to 660° C. in the presence of $N_2$ instead of 720° C.; and in that once the reaction temperature was reached, 20 ml/min of $Cl_2$, and 20 ml/min of CO were flown through the reactor instead of the 200 ml/min. Contrary to Example 1, only the formation of a very small quantity of $FeCl_3$ was noted during the length of the experiment.

The distribution of the PGM in the residue and the gas phase are presented in Table 1 for the sample noted PGM-2. As may be seen from Table 1 the sums of the PGM for the residue and the gas phases are: Pd 1102 ppb, Pt 328 ppb, Ir 21 ppb, Os 47 ppb, Rh 84 ppb and Ru 85 ppb. The PGM concentrations obtained from the nickel sulphide fire-assay, reported in Table 1, can be used as the 100% recovery mark. Hence, the sums of PGM values in the residue and the gas phases were recalculated as percent recovery in Table 2. The experimental error is in the order of ±15%. For Pd, Pt, Ir and Rh the recoveries are within 100±15% limits and are considered here as complete. For Ir, Ru and Os recovery are higher than 100%. Similarly as in Example 1, recoveries higher than 100±15% are attributed to the superiority of the carbochlorination process to extract PGM from chromites. As may be seen from Tables 1 and 2 the process is able to achieve complete extraction of all PGM from the feed. PGM are leached from the residue and gas phase streams, losses of PGM to the condensate stream appear to be negligible. The same experiment was tested where the carbochlorination temperature was 500° C. with results similar than those obtained at a temperature of 660° C.

Example 3

PGM Extraction with Water without Substantial Modification of Cr/Fe Ratio of Chromite Feed This example shows that the PGM chlorides salts formed during the carbochlorination may be leached by water and by slightly acidified HCl solution from the residue and gas phase streams. The corrosive action of water and diluted HCl solutions is weak when compare to more concentrate HCl solutions. Therefore, the leached solutions are less charged in chemical species, other than PGM salts, which can possibly interfere in the subsequent metallurgical steps.

The conditions used and steps followed in this experiment differed from those disclosed in Example 2 only in that water was used instead of HCl for 1) quenching the gas phase escaping the condenser; 2) for adding (100 ml) to the residue after the cooling period in the chlorination reactor. The water used as a trap for the PGM contained in the gas phase was analysed directly for the PGM.; and 3) for washing the solid condensate from the condenser area.

The distribution of the PGM in the residue and the gas phases are presented in Table 1 for the sample noted PGM-3. As may be seen from Table 1, the sums of the PGM for the residue and the gas phases were: Pd 652 ppb, Pt 153 ppb, Ir 25 ppb, Os 7.3 ppb, Rh 69 ppb and Ru 45 ppb. The PGM concentrations obtained from the nickel sulphide fire-assay, reported at the Table 1, can be used as the 100% recovery mark. Hence, the sums of PGM values in the residue and the gas phases were recalculated as percent recovery in Table 2. It is to note that the analytical error is in the order of ±15%.

The recoveries varied from a minimum of 41% for Os to a maximum of 129% for Ir. Although the complete recoveries of PGM in the residue was not optimized herein in regard of the HCl content of the leaching solution it is clear from the above that optimal conditions for which the PGM recovery in a diluted HCl solution would be comparable to those obtained with HCl 3 M may be routinely identified by a person of ordinary skill in the art without undue experimentation. Hence, it is possible to determine through routine experimentation what is the minimal concentration of HCl required to achieve an optimal PGM conversion. Such conditions are therefore encompassed by the present invention.

Example 4

Comparison of PGM Extraction in Absence and Presence of Co

Table 4 below shows that the dissolution of certain PGM mineralogical species is surprisingly more efficient in presence of CO than in the absence thereof. Hence the recovery of ruthenium and iridium is much higher when CO is present than when it is not.

TABLE 4

PGM extraction in presence and absence of CO

| | T °C. | $FCl_2$ (ml/min) | FCO (ml/min) | $FN_2$ (ml/min) | NaCl % | Pt recovery % | Pd recovery % | Ir recovery % | Rh recovery % | Ru recovery % | Os recovery % |
|---|---|---|---|---|---|---|---|---|---|---|---|
| PGM-A | 660 | 40 | 0 | 0 | 5 | 97 | 117 | 51 | 94 | <1% | 547 |
| PGM-B | 660 | 20 | 20 | 0 | 5 | 99 | 130 | 133 | 141 | 135 | 337 |
| PGM-C | 660 | 220 | 220 | 0 | 5 | 97 | 120 | 121 | 126 | 111 | 923 |

Time of reaction is 2 hours for all samples

Although the invention has been described above with respect to a few representative examples and drawings, it will be evident in the person skilled in the art that it may be modified and refined in various ways. It is therefore wished to have it understood that the present invention should not be limited in scope, except by the terms of the present claims.

The invention claimed is:

1. A method for recovering at least one platinum group metal (PGM) species as a corresponding PGM chloride salt in non-gaseous form from a feed product selected from the group consisting of chromite ore, chromite ore concentrate and PGM concentrate, said method comprising:
(a) mixing the feed product with at least one chloride salt so as to produce a mixture, wherein the concentration of chloride salt in the mixture is suitable for converting at least one PGM species into a corresponding PGM chloride salt;
(b) contacting the mixture with gaseous $Cl_2$ and CO at a temperature between about 240° C. and 800° C. to produce a catalytic system enabling a carbochlorination reaction to induce the conversion of said at least one PGM species into said corresponding PGM chloride salt while minimizing volatilization thereof; and
(c) recovering said corresponding PGM chloride salt.

2. The method of claim 1, wherein said temperature is between about 250° C. and about 800° C.

3. The method of claim 1, wherein said temperature is between about 350° C. and about 800° C.

4. The method of claim 1, wherein said temperature is between about 500° C. and about 800° C.

5. The method of claim 1, wherein said temperature is between about 500° C. and about 720° C.

6. The method of claim 1, wherein said temperature is between about 600° C. and about 800° C.

7. The method of claim 1, wherein said temperature is between about 620° C. and about 800° C.

8. The method of claim 1, wherein said temperature is between about 650° C. and about 800° C.

9. The method of claim 1, wherein said temperature is between about 660° C. and about 800° C.

10. The method of claim 1, wherein said temperature is between about 660° C. and about 720° C.

11. The method of claim 1, wherein the step of contacting the mixture with gaseous $Cl_2$ and CO is performed at a gas flow rate of at least about 20 ml/min.

12. The method of claim 1, wherein the at least one chloride salt is selected from the group consisting of NaCl, KCl, $MgCl_2$, and any combination thereof.

13. The method of claim 1, wherein the chloride salt is NaCl.

14. The method of claim 1, wherein the chloride salt is NaCl and forms at least about 5% w/w of the mixture.

15. The method of claim 1, wherein the chloride salt is NaCl and forms about 5% to about 20% w/w of the mixture.

16. A method for simultaneously recovering at least one platinum group metal (PGM) species as a corresponding PGM chloride salt in non-gaseous form from a feed chromite product and increasing the Cr/Fe ratio of said feed chromite product, wherein said feed chromite product is selected from the group consisting of chromite ore and chromite ore concentrate, said method comprising:
(a) mixing the feed chromite product with at least one chloride salt so as to produce a mixture, wherein the concentration of chloride salt in the mixture is suitable for inducing the selective extraction of iron and for converting at least one PGM species into a corresponding PGM chloride salt;
(b) contacting the mixture with gaseous $Cl_2$ and CO at a temperature of between about 240° C. and 750° C. so as to:
(i) induce the formation of a thin film of a melt around the chromite product;
(ii) promote the selective chlorination of iron and form gaseous $FeCl_3$; and
(iii) produce a catalytic system enabling a carbochlorination reaction to induce the conversion of said at least one PGM species into said corresponding PGM chloride salt while minimizing volatilization thereof; and (c) recovering said corresponding PGM chloride salt, thereby simultaneously producing an iron impoverished chromite product having an increased Cr/Fe ratio as compared to that of the feed chromite product.

17. The method of claim 16, wherein the at least one chloride salt is selected from the group consisting of NaCl, KCl, $MgCl_2$, and any combination thereof.

18. The method of claim 17, wherein the at least one chloride salt is in a concentration of about 5% w/w to about 10% w/w in the mixture.

19. The method of claim 17, wherein the at least one chloride salt is NaCl in a concentration of about 5% w/w to about 10% w/w in the mixture.

20. The method of claim 17, wherein the at least one chloride salt is NaCl in a concentration of about 5% w/w in the mixture.

21. The method of claim 16, wherein the contacting the mixture with gaseous $Cl_2$ and CO is performed at a gas flow rate of at least about 60 ml/min.

22. The method of claim 16, wherein the contacting the mixture with gaseous $Cl_2$ and CO is performed at a gas flow rate of at least about 200 ml/min.

23. The method of claim 16, wherein the temperature is between about 250° and about 720° C.

24. The method of claim 16, wherein the temperature is between about 670° and about 720° C.

25. The method of claim 1, wherein the $Cl_2$/CO ratio is between about 0.5 and about 1.5.

26. The method of claim 1, wherein the mixture is dried before (b).

27. The method of claim 1, wherein $N_2$ is used as a carrier gas during (b).

28. The method of claim 1, wherein the duration of the carbochlorination reaction in (b) is about 30 minutes to about 2 hours.

29. The method of claim 1, wherein the duration of the carbochlorination reaction in (b) is about 2 hours.

30. The method of claim 16, wherein the $Cl_2$/CO ratio is between about 0.5 and about 1.5.

31. The method of claim 16, wherein the mixture is dried before (b).

32. The method of claim 16, wherein $N_2$ is used as a carrier gas during (b).

33. The method of claim 16, wherein the duration of the carbochlorination reaction in (b) is about 30 minutes to about 2 hours.

34. The method of claim 16, wherein the duration of the carbochlorination reaction in (b) is about 2 hours.

* * * * *